March 18, 1947.  G. A. SHORT  2,417,571
DRAFT CONTROL MECHANISM
Filed Aug. 7, 1944  2 Sheets-Sheet 1

INVENTOR.
GEORGE A. SHORT
BY
Hyde and Meyer
ATTORNEYS

March 18, 1947.  G. A. SHORT  2,417,571
DRAFT CONTROL MECHANISM
Filed Aug. 7, 1944  2 Sheets-Sheet 2

INVENTOR.
GEORGE A. SHORT
BY
Hyde and Meyer
ATTORNEYS.

Patented Mar. 18, 1947

2,417,571

UNITED STATES PATENT OFFICE 2,417,571

DRAFT CONTROL MECHANISM

George A. Short, Cleveland, Ohio, assignor to Hotstream Heater Company, Cleveland, Ohio, a corporation of Ohio Application August 7, 1944, Serial No. 548,481

1 Claim. (Cl. 236—45)

This invention relates to control or operating mechanism for a furnace draft stabilizing damper. It is an improvement upon the construction shown, described and claimed in Patent No. 2,381,437, for Control means for draft regulators granted August 7, 1945, to Morris W. Crew and George A. Short, to which reference may be had for more complete understanding of certain of the features, if not completely described or shown here.

The control mechanism of said patent includes an operating member movable back and forth between two positions and driven in one direction by an electric motor of such form as to permit it to stall without injury, and in the opposite direction by suitable power means, such as a spring, said operating member being connected to the damper by disconnectible parts, all of the said parts being constructed and arranged so that with the mechanism in stand-by position and the motor deenergized, upon a thermostatic call for more heat, the motor is energized and drives the operating member in one direction to suddenly release the damper for normal stabilizing action during the period while the burner operates. When the demand for more or additional heat is satisfied, the motor circuit is deenergized and the operating member then is moved in the opposite direction by the power spring or other power source connected thereto, to slowly return the parts to their original position. Such mechanism includes speed reducing gearing driven by the motor and certain latch and holding devices.

The present invention has for its object to improve the mechanism of said patent by the inclusion therein of means in the operating connections between the motor and operating member so that positive driving relation between them is permitted in one direction only, as will more fully appear hereinafter, for the purpose of distributing the wear on the speed reducing gears uniformly over their entire periphery, instead of limiting it to only a part of the teeth; which prevents gear clash and the impact of the momentum of the motor armature upon the gear teeth when the parts come to rest, with possible damage of the gears, as heretofore; and which avoids any possibility of bounce or return of the parts by reverse motion with consequent inaccuracy and possible faulty operation of the latching and disconnectible operating parts.

Further objects of the invention in part are obvious and in part will appear more in detail hereinafter.

In the drawings, which represent one suitable embodiment of the invention:

Figure 1:
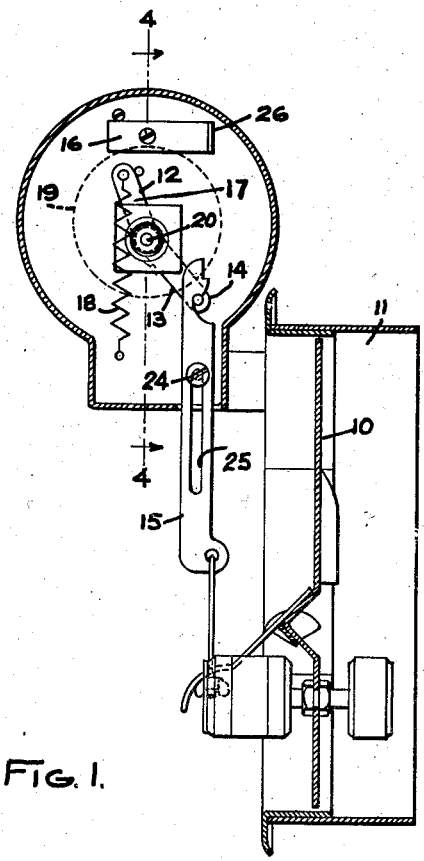
Fig. 1 is a longitudinal sectional elevation through a furnace damper provided with my improved control, the front wall of the control casing being omitted to expose interior parts.

Complete description of all of the parts of the mechanism is unnecessary, since reference may be had to said patent where that is desirable or necessary. It will suffice for this application to refer to many of the parts in a general way, as follows:

10 indicates a damper mounted for pivoting movement in a sleeve-like frame or housing 11 adapted for connection to a pipe leading from a furnace to the stack for controlling the flow of the check draft. Fig. 2 represents the stand-by position, in which the damper is held wide open, while Fig. 1 illustrates the position the parts assume upon a call for heat or more heat, the damper being free for normal stabilizing action.

Movement of the damper to one or the other of its positions is produced by an operating member 12, movable back and forth between two positions, as by reverse swinging motion about a pivot. The operating member shown, as in said patent, is a two-armed device, one arm of which, 13, is connected by disconnectible connections, indicated generally at 14, to a link 15 connected to the damper. The disconnectible connections cooperate with a pivoted latch 16. The other arm 17 of the operating member is connected to a suitable source of power, such as the tension spring 18.

Figure 2:
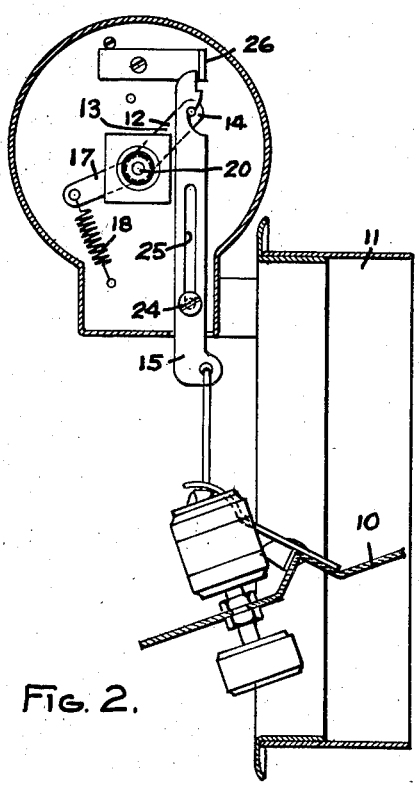
Fig. 2 is a similar view, showing the parts in another position.
Figure 3:
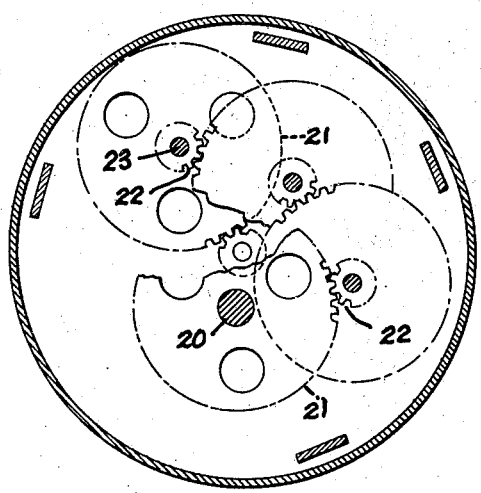
Fig. 3 is a detail sectional view illustrating the speed reducing gear.

The spring 18 always tends to move member 12 in the counter-clockwise direction, Fig. 1. It may also be driven in the clockwise direction by an electric motor, marked generally 19, which drives the shaft 20, around the axis of which member 12 turns, by means of speed reducing gearing shown more or less diagrammatically in Fig. 3, and including a series of large gears 21 and small pinions 22, the drive being from the motor shaft 23 to the first small pinion, then to a large gear, and so on to the final slow speed shaft 20.

With the arrangement described, as in the patent before referred to, the parts lie in the positions shown in Fig. 2 upon a stand-by. The electric motor is deenergized and the parts are held in the stand-by position by the tension of spring 18 and the engagement of pivot 24, about which link 15 swings, with the end of the slot 25 in said link. The upper end of said link engages the shoulder or abutment 26.

Upon a call for heat or more heat by the thermostat (not shown) said thermostat closes the motor circuit and the motor immediately begins to rotate in a direction to turn member 12 in the clockwise direction. Practically immediately, the disconnectible connections separate and the damper is released and moves promptly to its position shown in Fig. 1, for normal stabilizing action. The motor continues to rotate until finally the second arm of member 12, to which spring 18 is secured, engages a fixed stop, with the parts in the position shown in Fig. 1. There they remain until the call for heat is satisfied, whereupon the motor circuit is opened. The motor, of course, is of the ordinary clock motor type, capable of being stalled without injury, as described in said prior application.

When the motor circuit is opened spring 18 begins to turn member 12 in the opposite direction, also driving the rotor of the electric motor reversely through the speed reducing gearing, the latter serving to retard motion of member 12 and delay the completion of motion of the damper to the stand-by position shown in Fig. 2.

Figure 4:
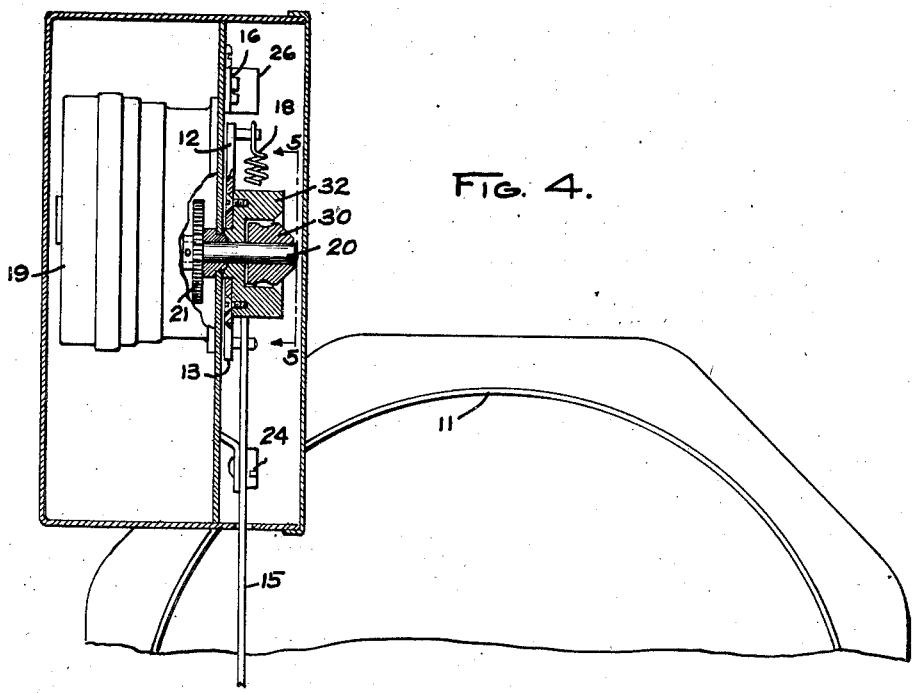
Fig. 4 is a sectional elevation, on a larger scale, on the line 4—4, Figs. 1 and 3, showing the one-way clutch.

According to the present invention, for purposes and advantages to be later referred to I introduce into the driving connections between the electric motor and operating member 12 a suitable one-way or overrunning clutch device or mechanism, of such form, and so arranged, that driving effect may be produced from the speed reducing gearing to member 12, or reversely from member 12 to the speed reducing gearing, but in each case only in one direction. The drawings show for the purpose the particular one-way clutch mechanism illustrated in Figs. 4, 5 and 6. It comprises hub 30 secured by a set screw 31 to the end of the slow motion shaft 20 of the speed reducing gearing, to which also is secured, as shown in Fig. 4, the last large gear 21 of the speed reducing gearing. Surrounding the hub 30 is a block 32, shown as of square form in end view, Fig. 5, and upon a central boss 33 of which the arm or operating member 12 is sleeved and fastened so that the arm and block always turn together.

Block 32 is provided with two opposite deep holes or recesses 34, bored in from opposite faces of the block, in each of which is located a steel ball 35, sensitive to the effect of a compression spring 36. When the parts are assembled the balls 35 lie opposite a shallow groove 37 in the hub. All the parts of the one-way or overrunning clutch, including the hub and block and their contained parts, are made very small and compact to save space, the block being possibly no more than a half-inch from face to face.

With the construction described, assuming the parts in the stand-by position Fig. 2, and that the thermostat has called for heat or more heat and thus has closed the motor circuit, the motor begins to turn in the clockwise direction Fig. 1. Practically immediately the disconnectible parts are disconnected, as in said patent, and the damper promptly moves to the position shown in Fig. 1, for normal stabilizing action. The motor continues to operate, turning shaft 20 and hub 30 in the clockwise direction Fig. 5, thereby driving block 32 through the balls 35, and turning member 12 until it engages the fixed stop. Thereupon movement of member 12 stops, and through the clutch fully prevents further advance or rotation of the motor rotor and reducing gear. The parts are held in this position, with the motor stalled, so long as the motor is energized.

Figures 5, 6:
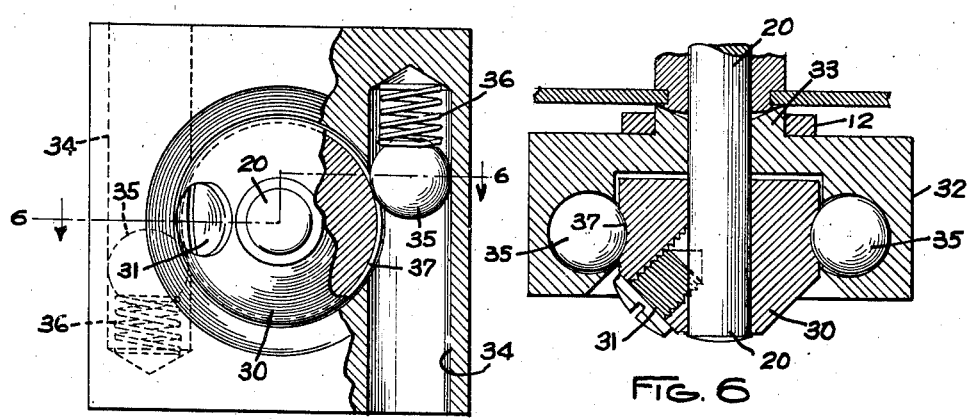
Fig. 5 is in part an elevation from the left in Fig. 4, and in part a section on the line 5—5, Fig. 4.
Fig. 6 is a sectional plan view on the line 6—6, Fig. 5.

When the call for heat is satisfied, the thermostat opens the motor circuit, as before described, and the spring 18 becomes the operating power source, exerting its effect through member 12 upon the block 32, driving it in the counterclockwise direction Fig. 5 and through the clutch balls, also turning hub 30, shaft 20, the reducing gearing, and the motor rotor in the reverse direction from before. This operation continues until finally the parts reach the position shown in Fig. 2, with the pin 24 at the end of the slot 25 and forming a positive stop for motion of member 12. However, the one-way clutch now permits the hub 30, shaft 20, speed reducing gearing and the motor rotor to continue to rotate until the force and tendency to move have been expended in friction. The parts are then ready for the next cycle of operations.

One advantage of the construction is that wear of the last large gear 21, fastened to shaft 20, is distributed over all of its teeth and is not confined to about ¼ or ⅓ of its teeth, as was the case with the prior construction, where motion of member 12 was limited to from 90 to 120°. During every cycle of operations when the parts reach the stand-by position the motor coasts and brings a new set of pinion teeth into the operative position. The same effect prevents the application of shock and jar to the gear teeth by the application of the pressure and force of the turning motor armature, through the speed reducing gearing, to the gear teeth, and avoids stripping of the gears and their wear or injury.

Finally, and probably more important, the mechanism avoids any possible rebound effect as the parts reach the stand-by position of Fig. 2. Heretofore, when the shaft 20 has been positively connected to member 12, so that the two parts always rotate together, when the parts reach the stand-by position, driven by the force of spring 18, at the moment of impact of the pivot pin 24 with the end of the slot 25, the heavy force of the rotating motor armature causes it to rebound, as it were, so that in actual practice it may rotate reversely as much as 10 or 15 revolutions. This rebound effect sometimes has been sufficient to unlatch the disconnectible parts and permit false operation or motion of the damper, undesirably, to its position for normal stabilizing action, even though at times the shoulder 26 of latch 16 has been given increased depth to overcome the difficulty. Such rebound is absolutely prevented by the use of the one-way clutch described, as will be readily understood, and avoids any necessity of specially forming the latch parts.

The construction described is simple, durable, effective, and not liable to get out of order, and may be applied both to new control devices or as replacement parts for those already in use.

Further advantages of the invention will be apparent to those skilled in the art.

What I claim is:

Control means for a furnace draft stabilizing damper, comprising an electric motor adapted while energized to be stalled without injury thereto, means operatively connecting said motor and damper and having stand-by and release positions, said connecting means including speed reduction gearing connected to the motor rotor, an operating member driven thereby and movable back and forth a disconnectible connection from said member to the damper, means adapted upon energization of the motor under stand-by conditions, promptly to disconnect said connection, power means effective upon said member and tending to move it reversely to its movement by the motor, and one-way clutch means between said reduction gearing and operating member arranged to permit through drive by either the motor or the power means.

GEORGE A. SHORT.

REFERENCES CITED

The following references are of record in the file of this patent:

UNITED STATES PATENTS

| Number | Name | Date |
|---|---|---|
| 2,169,168 | Shipley | Aug. 8, 1939 |